United States Patent [19]

Rieke

[11] Patent Number: 4,522,296

[45] Date of Patent: Jun. 11, 1985

[54] FLAIL AUGER FOR SEMI-LIQUID MANURE SPREADER

[75] Inventor: David M. Rieke, Celina, Ohio

[73] Assignee: The Paul Revere Corporation, Coldwater, Ohio

[21] Appl. No.: 580,936

[22] Filed: Feb. 16, 1984

Related U.S. Application Data

[63] Continuation-in-part of Ser. No. 372,423, Apr. 27, 1982, abandoned.

[51] Int. Cl.$^3$ .............................................. B65G 33/30
[52] U.S. Cl. ...................................... 198/548; 198/664; 198/676; 222/228; 222/406; 222/412; 241/260.1; 414/507; 414/526
[58] Field of Search ............... 239/658, 672, 675, 679, 239/172; 366/603 X, 266, 186, 156; 222/228 X, 240, 242, 410, 342, 412, 406 X; 198/548, 558, 676, 657, 664, 665, 670, 677; 414/507 X, 518, 324, 319, 320, 321, 526; 241/260.1 X

[56] References Cited

U.S. PATENT DOCUMENTS

| | | | |
|---|---|---|---|
| 3,241,841 | 3/1966 | Kucera | 239/679 X |
| 3,379,323 | 4/1968 | Knutsen | 222/228 X |
| 3,420,452 | 1/1969 | Vaughan | 239/675 X |
| 3,497,229 | 2/1970 | Sietmann et al. | 198/665 X |
| 4,082,227 | 4/1978 | McGrane et al. | 239/675 |
| 4,364,667 | 12/1982 | Reiner | 198/664 X |

Primary Examiner—Jeffrey V. Nase
Attorney, Agent, or Firm—Abraham Ogman; Robert J. McNair

[57] ABSTRACT

A flail auger assembly is disclosed which is useful for unloading semi-liquid material from a holding tank mounted on a tractor drawn trailer. A rotatably mounted shaft extends lengthwise through the lower portion of the tank. One end of the shaft penetrates the front wall of the tank enabling connection with the power takeoff of the tractor. The second end penetrates the rear wall of the tank where it connects with the impeller of the discharge pump. A plurality of flails extend radially outward at regular intervals along the shaft. The flails are pivotally attached via pins which secure them to brackets welded to the rotatably mounted shaft. The pivotal axis of each flail allows it to aggressively attack the material in the tank while at the same time limiting the power drain on the tractor since the radius of effectiveness decreases as a function of increasing load. The outward extending second end of the flails are twisted with respect to the pivot axes to impart both a chopping action and a rearward thrust to the semi-liquid material in the holding tank. The rearward thrust forces the semi-liquid slurry to enter the discharge pump via a port in the lower rear wall of the tank.

8 Claims, 6 Drawing Figures

FLAIL AUGER FOR SEMI-LIQUID MANURE SPREADER

This is a continuation-in-part of application Ser. No. 372,423 filed Apr. 27, 1982, now abandoned.

BACKGROUND OF THE INVENTION

This invention relates to a flail auger assembly for a semi-liquid type manure spreader. The spreader has an open or openable top for ease of loading by power equipped means. The manure will vary in composition from a slurry to a semi-solid containing fibrous plant and vegetable waste material. It is important that the spreader distribute this manure evenly across the field and that the mechanism does not become clogged during use.

Several manure spreading machines exist in the art. Some are designed for spreading liquid manures. Others are designed for spreading fibrous manure solids. The U.S. Pat. No. 3,420,452 to Vaughn shows one approach for handling liquid manure. Vaughn discloses a cylindrical tank supported on its side by a tractor drawn trailer The power takeoff from the tractor is coupled to a shaft which penetrates the front end of the tank near the bottom. The shaft runs the length of the tank leaving at the lower rear wall where it serves as the drive for a centrifugal pump. That portion of the shaft on the inside of the tank includes an auger mechanism for continuously stirring the liquid manure slurry. The tank is filled by means of a hatch on the top. A discharge port near the bottom of the rear wall of the tank allows liquid manure to enter the centrifugal pump. The blades of the impeller fling the manure slurry a considerable distance in an arc way away from the aperture in the pump housing.

The U.S. patent to Hodgson (U.S. Pat. No. 4,056,226) is an example of another type of liquid manure spreader. In the Hodgson system, the liquid manure slurry is carried in a mobile tank from which it may be discharged either through a nozzle or through soil injectors directly into the ground.

The U.S. Pat. No. 3,253,834 to Bing et al discloses an endgate assembly for a more conventional type of manure spreader. With this endgate, manure having a relatively high moisture content can be handled without leakage when going from feedlot or barn to field.

The Vanguard model spreader produced by the Hedlund Mfg. Co., Inc., of Boyceville, Wis. discloses yet another approach. It utilizes a series of spiraled paddles fixedly attached to the central shaft in order to move liquids and semisolid manure to the expeller.

None of the above spreaders do an adequate job when loaded with semi-liquid manure. My invention of the flail type auger provides the aggressive converging and mixing action needed to shred and break up the masses of materials to be spread. Further, my flail type auger consumes less horsepower than the prior art paddle and auger flight implementations.

SUMMARY OF THE INVENTION

The object of this invention is to reliably convey semi-liquid manure from the holding tank into the spreading mechanism. As implemented, the spreader consists of a tank of generally triangular cross section and about twelve feet long supported on its side by a tractor drawn trailer. The tank is open at the top with a narrow base and vertical end walls. The power takeoff (PTO) of the tractor is coupled to a shaft which penetrates the front wall of the tank near the bottom. The shaft runs the length of the tank exiting at the lower rear wall to drive the impeller of a radial flow pump.

That portion of the shaft which is on the inside of the tank consists of a four inch or larger diameter pipe on which are mounted a plurality of radially extending flails. Each flail comprises a strip of metal which is pivoted on an axis which is parallel to the shaft axis. The outward extending end of each flail is twisted with respect to the pivot axis. As a result, rotation of the shaft causes each flail to urge surrounding material laterally along the central shaft. By twisting the ends of all flails both in the same direction and by a similar amount, the manure will be aggressively conveyed rearward to the discharge assembly. The discharge assembly is reached via a port through the rear wall of the tank.

By pivoting each flail, the torque required to start the shaft turning will be lower than would be the case if they stuck out rigidly like a fan blade. Pivoted as they are, the flails will lie back against the shaft when first driven by the PTO and when contacting dense material. As the turning rate increases, centrifugal force causes the flails to extend outward to a more nearly radial position.

My discovery resulted from an effort to configure a semi-liquid spreader operable with an 80 Hp farm tractor. Tests have shown that use of pivoting flails creates a torque load of approximately 70 Hp when the cargo box is loaded with semi-solid material and the shaft is turning at 540 rpm. The pivoted flails adapt to the load. When contacting dense fibrous material the flails, by pivoting backward somewhat, reduce their sphere of influence in that the tip of each flail extends a smaller distance out from the center of the shaft.

If the manure gets mixed to a fine slurry or if slabs of manure encrusted straw tend to bridge over the rotating flail auger assembly, the operating radius of the flail tips increases. The centrifugal force resulting from the rapidly spinning auger causes the flails to try to extend radially outward from the central shaft unless they encounter a resistive medium. The ability of the flails to change their effective radius of influence limits the peak power drain on the tractor while at the same time preventing problems such as bridging because the sphere of influence was insufficient.

Secondly, if manure constituents become frozen in the bottom of the tank the flights of a conventional auger become immobilized. With the pivoted flails, there is both sidewise and endwise motion which tends to tear the shaft assembly free of the ice. Thirdly, the flails are less susceptible to damage from rocks or chunks of wood which might be accidentally loaded in along with the manure. The flails can deflect away from such hard objects. Additionally, the flails are more effective than a continuous auger for shredding and breaking of masses of material. Turbulence of the rapidly rotating flails helps prevent voids from becoming established.

Another advantage of the flails is their self cleaning ability. Pieces of twine are often found embedded in the manure. In the prior art machines, lengths of twine and even long strands of crop stems become wrapped around the auger shaft to the extent that messy hand cleanout is required. Clean-out of wrapped strands is not needed with my invention. The rotating flails discourage wrapping by cutting or breaking any strands which impinge on or in the area of the flails. When spreading very heavy concentrations of twine, some wrapping may occur especially at the point where the flails stop at the impeller. Even then, tests show that the flail auger is self cleaning for the wrapped material will be gone after hauling a few more loads of manure.

DESCRIPTION OF THE PREFERRED EMBODIMENT

Figure 2:
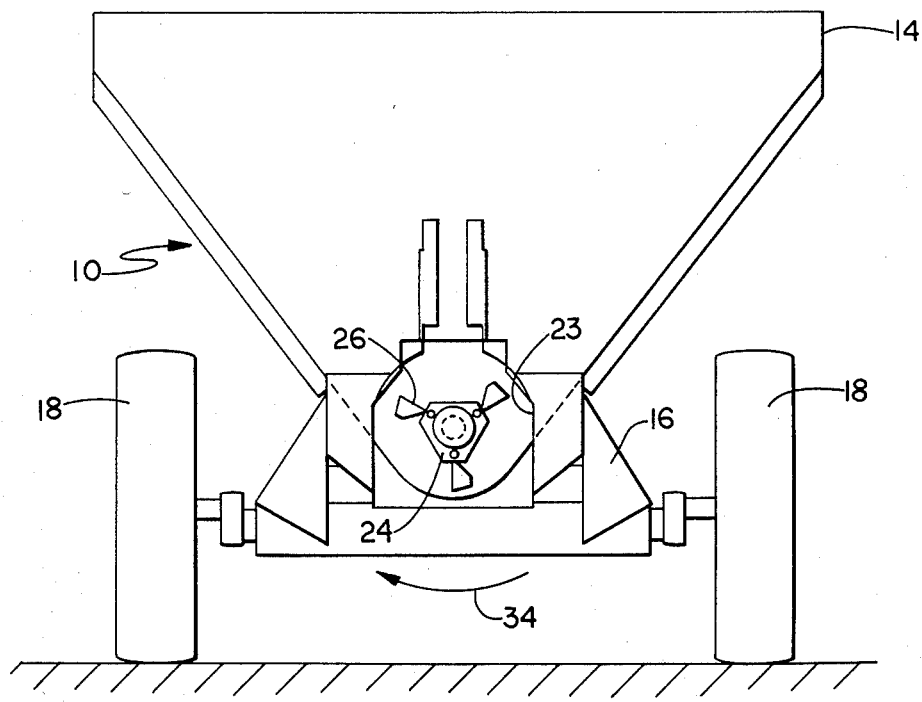
FIG. 2 is a rear view of the spreader showing the triangular configuration of the storage tank and the relative position of the flail auger in the lower part of the tank.
Figure 3:
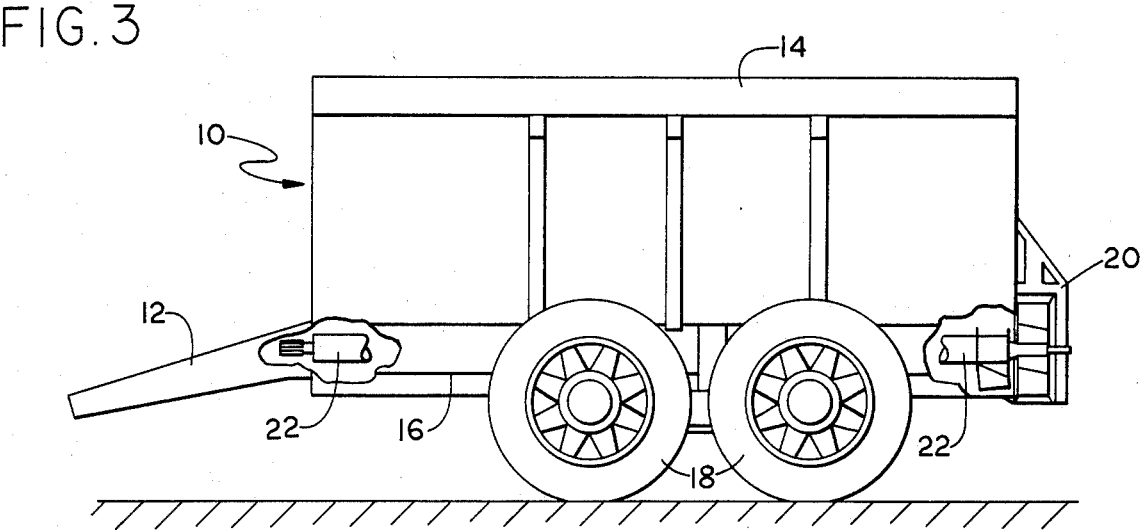
FIG. 3 is a side view of the spreader with partial cutaways to show the flail driving shaft.

FIGS. 2 and 3 show the semi-liquid type manure spreader which uses the flail auger assembly. FIG. 3 shows a spreader 10 which attaches by means of a drawbar hitch 12 to a tractor (not shown). Spreader 10 has a holding tank 14 mounted on a chassis 16 which is carried on tandem wheels 18. Mounted near the bottom of the rear wall of tank 14 is a centrifugal pump 20. The impeller blades of pump 20 fling the manure sideways away from the rear of the spreader. Pump 20 is powered by shaft 22 which receives its torque from the power takeoff shaft of the tractor. Shaft 22 extends the length of tank 14. The casing of pump 20 communicates with the inside of tank 14 by means of a port cut through the rear wall of the tank. FIG. 2 shows the casing of the pump removed. This allows a view of the inside of tank 14 as seen through the discharge port 23. In the spreader reduced to practice tank 14 was approximately 12 ft. long by 5 ft. high.

Figure 4:
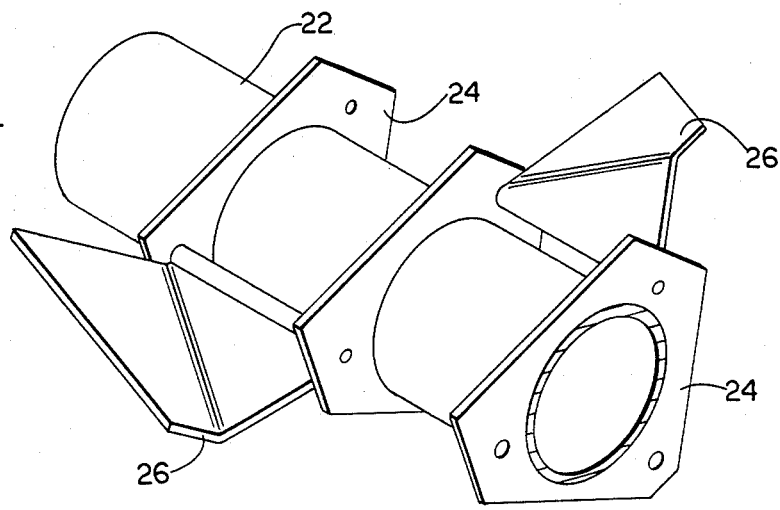
FIG. 4 is a perspective view of a section of the flail auger.

Shaft 22 (see FIG. 3) extends from one end wall to the other of tank 14. There are bearing supports at each end of the tank. In the unit reduced to practice shaft 22 was a hollow pipe having a diameter of approximately 5 in. FIG. 4 shows the manner in which the flails are attached to shaft 22. Triangular shaped brackets 24 slide onto shaft 22 where they are welded in equi-spaced aligned locations. FIG. 4 shows a segment of shaft 22 having three of the brackets 24. Each bracket 24 has three holes 25 therein spaced 120° apart. In the unit reduced to practice there were 22 of the brackets spaced at equal intervals along shaft 22. Spacing between brackets was approximately 6 in.

Figure 6:
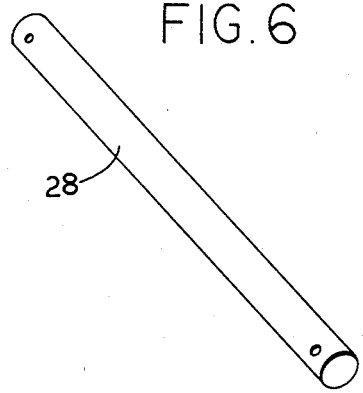
FIG. 6 is a perspective view of the pin which secures the flail to the FIG. 5 bracket.

Flails 26 were attached to brackets 24 by means of pin 28 (see FIG. 6). Each flail 26 was formed from flat stock metal having a size of 7 in. by 6 in. by 0.23 in. thick. The flat stock metal was then formed into the bent paddle shape shown in FIGS. 1 and 4. As shown in FIG. 4 each space between brackets 24 contained one of the flails 26. Successive stations along the shaft had the flails 22 secured 120° removed from adjacent flails. In the unit reduced to practice there were 21 stations along the length of shaft 22. Twenty of the flails 26 were spaced at successive 120° intervals. At the station nearest the rear wall there were three flails 26 each spaced 120° apart as may be seen in FIG. 2. Placing three flails at the rear wall assured continuous feeding of manure into the impeller of pump 20.

Figure 1:
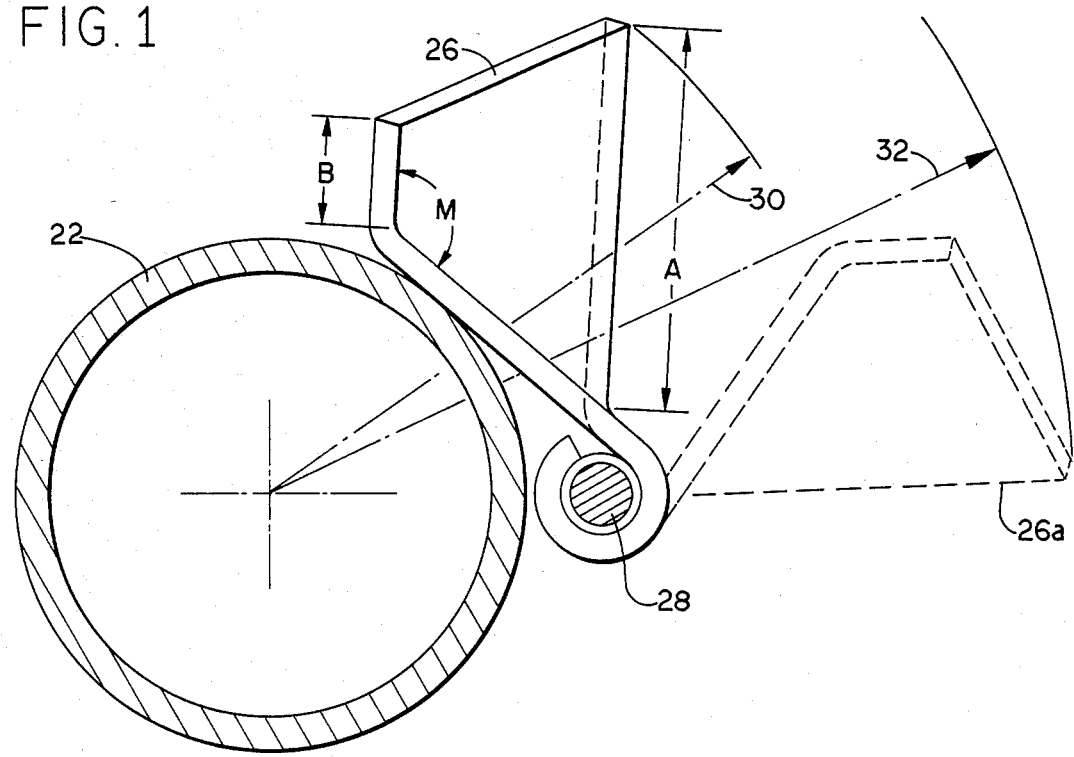
FIG. 1 is a cross sectional view of the shaft showing the relative position of a flail in both its extended and laid back positions.

FIG. 1 shows flail 26 in its most compressed and more extended positions. When shaft 22 first begins to turn, flail 26 will be rotated back so that the rear side of the flail touches the shaft. In this position the radius of effectiveness of the flail is at a minimum as shown by arrow 30. As the rotational speed of shaft 22 increases, centrifugal force will cause flail 26 to try to rotate forward about pin 28. The dashed line flail 26a depicts the flail at an extended forward position where its radius of effectiveness is shown by arrow 32. Thus with the radius of effectiveness being proportional both as regards the speed of shaft 22 and the resistance of the material through which it operates, my invention does an effective job of both chopping up the semi-liquid manure and feeding it to the centrifugal pump.

Attached as they are to shaft 22 (See FIG. 3) the flails rotate at the same speed as the PTO shaft of the tractor which is typically 540 rpm. Tests show that for the system reduced to practice the power drain on the tractor when processing semi-solid manure is about 70 Hp. for the case where the flails are in the laid back position (Radius 30 of FIG. 1). As implemented, radius 30 was approximately 4.5 in. As the drag resistance decreases, the flails extend further outward because of centrifugal force until an effective radius 32 is reached which in the machine reduced to practice amounted to 9 inches. This produces a total swing diameter of 18 inches for preventing cavitational voids. Power drain on the tractor remains at a peak value of less than 70 Hp. This would not be the case if the rigidly attached augers or paddles of the prior art machines were used. To get an 18 inch maximum effective radius for the prior art machines would draw 140 Hp from the tractor, thus overloading it. Using the pivoted flails of my invention which respond through centrifugal force allows them to reach out to make contact with the fibrous load yet tends to limit the power drain on the power source. This makes the semi-liquid manure spreader having my flail auger assembly compatible with the 80 Hp farm tractors commonly used by farm operators.

Typical parameters of the degree of twist incorporated into each flail can be discerned by reference to FIG. 1. In the system reduced to practice, each flail 26 was bent around a diagonal line connecting a point a distance A along the far edge to a point a distance B from the near edge. The outward extending end of the flail was then bent at the diagonal line to produce an included angle M between the inner and outer portions of the flail equal to 120 degrees. Typical dimensions for A equal 3.75 inches and for B equal 1.125 inches. Twists of this magnitude were found to effectively propel the semi-liquid product axially along the shaft toward the port in the rear wall of the tank.

FIG. 2 also shows the direction of rotation of the shaft 22 (see arrow 34). The shaft 22 is positioned with respect to the bottom of tank 14 such that the tips of flails 26 can never impact the bottom of the tank. In the unit reduced to practice the bottom of tank 14 was curved along a circular arc which was coextensive with the converging bottom sides of the tank. The radius of curvature of the tank bottom was 1.18 in. greater than the greatest radius achievable by the tips of the flails 26.

With the pivoting flails attached to the central shaft as explained above, the entire spreader can operate at the standard 540 rpm available from the PTO of the tractor. This assures both a reliable and simple design. The power requirements are relatively constant when processing a wide range of materials of varying consistency. This results from using pivoted flails whose bite extends or retracts directly as a function of the ratio between the load resistivity and the centrifugal force generated by the spinning shaft.

Figure 5:
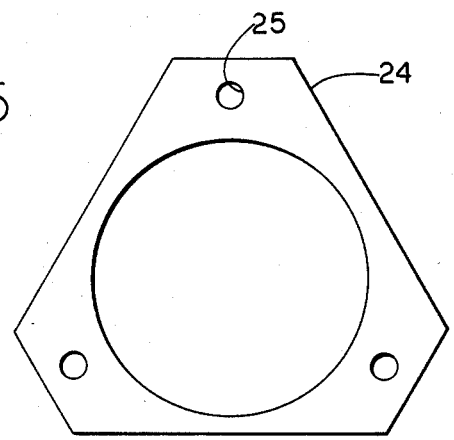
FIG. 5 is a side view of the triangular bracket which is used to attach the flails to the main shaft.

A second version of the flail auger was tested. It consisted of welding the edge of the flail to the surface edge of the pin. With the pin of FIG. 6 welded to the edge of the flail, assembly as shown in FIG. 4 was not possible. Instead of using the triangular shaped brackets 24 shown in FIG. 5, a small U-shaped bracket was used to keeper each end of the flail pin to the central shaft. The double ends of the U-shaped brackets were welded directly to the central shaft during assembly simultaneously with flail placement of successive units at 120 degree intervals. The entire flail auger assembly was then installed in the tank by inserting it from the rear through the discharge port opening.

In some implementations it is foreseen that the axis of the pin which holds a pivotal flail to the shaft can be something other than parallel to the shaft axis. Also axes of the multiplicity of flails will not necessarily be parallel to each other. It may be advisable to progressively change the pin axis orientation as one proceeds along the length of the central shaft.

While the preferred embodiment describes the flail auger assembly having a single flail at each station along the driving shaft, it will be understood that other implementations of the invention may utilize placement of more than one flail per station along the shaft. Additionally, the flails have been described as all having the same degree of twist. In some implementations it may be advantageous to use flails having a multiplicity of degrees of twists. It is to be further understood that the flail augers could be incorporated into an assembly having a solid central shaft rather than a hollow shaft.

While the flail auger has been described in conjunction with a semi-liquid manure spreader, it is anticipated that the pivotal flails are equally useful in other material handling applications. Preliminary tests show the flail auger concept to be efficacious as a liquidizer and/or blender of a large variety of wet or granular materials being delivered to the entrance of a pump. By pivotally mounting the flails as described above, bridging of solid materials above the central shaft tends to be eliminated due to the aggressive hammer-like action of rotating plates. The twist incorporated into the individual flails both churns up the material surrounding the central shaft and urges it laterally along from station to station. Thus, the flails both homogenize and convey material along the central shaft operating both as an auger and a blender.

Thus, while the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

I claim:

1. A flail auger assembly for a material unloader having a holding tank with a shaft rotatably mounted and extending through the lower portion of the holding tank, one end of the shaft penetrating an aperture in a wall of the holding tank through which material is removed, there also being means for rotating the shaft associated with the holding tank; and a plurality of flails mounted at spaced intervals along the length of the shaft, each of said flails being independently secured thereto by a pivot for permitting lateral rotation of said flails relative to said shaft so that the flails can assume a compressed position with a small radius of effectiveness adjacent to the shaft or an extended position with a large radius of effectiveness in response to the resistive qualities of the material in said holding tank and the centrifugal forces imparted to said flails by the rotating shaft, said flails being oriented with respect to the shaft to cooperate with the holding tank to impart both stirring of the material within the holding tank and a lateral component of thrust on said material by one flail to the next flail along the shaft for moving material out through the aperture in the wall.

2. The flail auger assembly of claim 1 wherein the bottom of the holding tank is curved along an arc of circular cross section coextensive with the converging sidewalls, the radius of curvature of said bottom being greater than the greatest radius achievable by the tips of the rotating flails.

3. The flail auger assembly of claim 1 wherein all flails are twisted the same amount, each flail being bent around a diagonal line across its face to produce an included angle between the inner and outer portions equal to 120 degrees, the diagonal extending from a point near the axis on the edge facing the front wall of the tank to a point approximately 70 percent out along the flail edge facing downstream toward the rear wall.

4. The flail auger assembly of claim 1 wherein said shaft rotates at a nominal 540 rpm.

5. A flail auger assembly for a material unloader having an open topped, trailer mounted holding tank with front and rear end walls, said unloader being drawn and powered from an external source, there being an aperture in the lower rear wall of the tank which provides access to an auxiliary housing containing a pump having a rotatable impeller for discharging semi-liquid products through a discharge opening, the flail auger assembly comprising:

a shaft rotatably mounted and extending lengthwise through the lower portion of the tank, one end of said shaft being operably connected with said impeller after penetrating said rear wall; the second end of the shaft penetrating the front wall of said tank to enable connection with the external power source, a multiplicity of brackets secured at spaced intervals to said shaft, each bracket extending transversely from said shaft and positioned at a spaced interval from the next adjacent bracket;

a plurality of flails, at least one of said flails being mounted between adjacent pairs of said brackets, each flail being pivotally secured to one or more of said brackets, said flails being movable about said pivot for permitting lateral rotation of said flails relative to said shaft, said flails being oriented with respect to the shaft to cooperate with the holding tank to impart a lateral component of thrust on said material by one flail to the next flail along the shaft and thereby move materials out through the aperture in the rear wall of said holding tank; and driving means for rotating said shaft at a rate sufficient to urge said plurality of flails to extend radially outward from their pivots due to centrifugal force, the resistive qualities of the material impacted by each flail determining its radius of effectiveness, a small radius resulting from a flail being laid back against the shaft when operating with difficulty in hard to stir loads, a larger radius resulting when the flails encounter a low resistance, the ratio of the larger radius to the smaller being a nominal 2 to 1, the pivotability of said flails serving to limit the load on said driving means.

6. The flail auger assembly of claim 5 wherein each flail is approximately six inches wide.

7. The flail auger assembly of claim 5 wherein each station between brackets has mounted therein one flail and successive stations along the shaft have flails secured so as to be 120 degrees removed from adjacent flails.

8. The flail auger assembly of claim 7 wherein a flail is secured by pin means between two adjacent brackets.

* * * * *